(12) United States Patent  
DaCosta

(10) Patent No.: US 7,747,921 B2
(45) Date of Patent: Jun. 29, 2010

(54) SYSTEMS AND METHODS FOR TRANSMITTING DATA OVER LOSSY NETWORKS

(75) Inventor: Behram DaCosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 750 days.

(21) Appl. No.: 11/197,818

(22) Filed: Aug. 5, 2005

(65) Prior Publication Data

US 2007/0058635 A1  Mar. 15, 2007

(51) Int. Cl.
*G06F 11/00* (2006.01)
*G08C 25/02* (2006.01)
*H04L 1/18* (2006.01)
*H03M 13/00* (2006.01)

(52) U.S. Cl. .................. 714/748; 714/749; 714/750; 714/751

(58) Field of Classification Search ......... 714/704–708, 714/748–751
See application file for complete search history.

(56) References Cited

U.S. PATENT DOCUMENTS

| | | | | |
|---|---|---|---|---|
| 3,934,224 A | * | 1/1976 | Dulaney et al. | 714/750 |
| 4,383,315 A | * | 5/1983 | Torng | 370/452 |
| 4,633,462 A | * | 12/1986 | Stifle et al. | 370/448 |
| 4,835,731 A | * | 5/1989 | Nazarenko et al. | 455/508 |
| 5,020,132 A | * | 5/1991 | Nazarenk et al. | 455/17 |
| 5,128,930 A | * | 7/1992 | Nazarenko et al. | 370/340 |
| 5,164,942 A | * | 11/1992 | Kamerman et al. | 370/334 |
| 5,191,585 A | * | 3/1993 | Velazquez | 714/807 |
| 5,206,863 A | * | 4/1993 | Nazarenko et al. | 714/752 |
| 5,212,724 A | * | 5/1993 | Nazarenko et al. | 455/560 |
| 5,339,316 A | * | 8/1994 | Diepstraten | 370/401 |
| 5,357,525 A | * | 10/1994 | Moriue et al. | 714/748 |
| 5,453,987 A | * | 9/1995 | Tran | 370/447 |
| 5,502,733 A | * | 3/1996 | Kishi et al. | 714/748 |
| 5,550,847 A | * | 8/1996 | Zhu | 714/748 |
| 5,646,686 A | * | 7/1997 | Pearlstein | 348/392.1 |
| 5,768,533 A | | 6/1998 | Ran | |
| 5,963,559 A | * | 10/1999 | Ohki | 370/445 |
| 6,088,342 A | * | 7/2000 | Cheng et al. | 370/320 |
| 6,256,334 B1 | * | 7/2001 | Adachi | 375/132 |
| 6,289,054 B1 | | 9/2001 | Rhee | |
| 6,400,695 B1 | * | 6/2002 | Chuah et al. | 370/310 |
| 6,430,661 B1 | * | 8/2002 | Larson et al. | 711/158 |
| 6,594,240 B1 | * | 7/2003 | Chuah et al. | 370/328 |
| 6,643,318 B1 | * | 11/2003 | Parsa et al. | 375/141 |
| 6,674,765 B1 | * | 1/2004 | Chuah et al. | 370/458 |
| 6,708,107 B2 | * | 3/2004 | Impson et al. | 701/117 |

(Continued)

OTHER PUBLICATIONS

Scäfer, Ralf et al., *The emerging H.264/AVC standard*, EBU Technical Review, Jan. 2003, pp. 1-12.

*Primary Examiner*—Joseph D Torres
(74) *Attorney, Agent, or Firm*—Dickstein Shapiro LLP

(57) ABSTRACT

An encoder/decoder system usable to decrease the probability of a failed transmission over a lossy wireless network. In one embodiment, data packets unsuccessfully sent over the wireless network may be retransmitted a particular number of times, depending on how important the data in the lost packet is. In another embodiment, the probability of successful decoding at the client side may be done by signaling to the server side that multiple reference frames should be used for subsequent prediction operations.

14 Claims, 6 Drawing Sheets

U.S. PATENT DOCUMENTS

| | | |
|---|---|---|
| 6,741,554 B2 | 5/2004 | D'Amico et al. |
| 6,792,286 B1 * | 9/2004 | Bharath et al. ............ 455/554.2 |
| 7,031,273 B2 * | 4/2006 | Shores et al. ................ 370/320 |
| 7,061,942 B2 * | 6/2006 | Noronha et al. ............. 370/537 |
| 7,158,473 B2 * | 1/2007 | Kurobe et al. ............... 370/204 |
| 7,184,421 B1 * | 2/2007 | Liu et al. ..................... 370/338 |
| 7,243,284 B2 * | 7/2007 | Machulsky et al. ......... 714/748 |
| 7,355,976 B2 * | 4/2008 | Ho et al. ...................... 370/235 |
| 2003/0112754 A1 | 6/2003 | Ramani et al. |
| 2004/0218816 A1 * | 11/2004 | Hannuksela ................. 382/232 |
| 2005/0031097 A1 | 2/2005 | Rabenko et al. |

* cited by examiner

SYSTEMS AND METHODS FOR TRANSMITTING DATA OVER LOSSY NETWORKS

FIELD OF THE INVENTION

The invention relates in general to transmitting data over lossy networks, and in particular, to improving data transmission performance over lossy wireless network connections.

BACKGROUND OF THE INVENTION

Typical problems associated with transmitting compressed video over wireless networks include Quality of Service (QoS), latency and maintaining basic image integrity. For example, if a single packet of transmitted video data is lost, the fact that the video data is typically compressed in the temporal domain can cause propagation and cascading of a single artifact in one frame through multiple successive frames. Such lossy wireless networks may operate wireless protocols, such as those described by IEEE 802.11x and 802.15.3a, and video compression algorithms such as those described by the AVC video standard. Lossy networks may use transmission methods other than wireless such as, for example, HomePlug AV Powerline Communications.

During video transmission over a lossy network, video data (sometimes referred to as "video packets") may be lost. For example, wireless lossy transmission mediums can be unreliable in that the transmitted video packets may not always be received (accurately or at all) by the wireless receiver. To counter this, the 802.11x Media Access Control (MAC) requires that in most cases a packet (or group of packets for 802.11e extensions to the standard) that is received will be acknowledged to the transmitter by sending back an "ACK" signal. Hence a missing ACK signal normally indicates that a video packet (or packets) has been lost.

In addition, video packet data can also be lost at the receiver. For example, as Advanced Video Coding (AVC) encoded data tends to be bursty, an unexpectedly large burst can overflow buffers on the receiver-side at several locations between the 802.11x module and the AVC decoder itself. Most packets lost in this way can be detected by Real-Time Transport Protocol (RTP) feedback.

To alleviate some of the inherent drawbacks associated with lossy network communication, various data recovery and error correction features have been built into the data coding standard used. For example, H264/AVC is a more recently developed coding standard which includes a Video Coding Layer (VCL) to efficiently represent the video content, and a Network Abstraction Layer (NAL) to format the VCL representation of the video and provide header information in a manner appropriate for conveyance by particular transport layers or storage media. Despite these efforts, there is a need to improve transmission reliability and error concealment over lossy network connections, such as 802.11x networks.

Thus, there is still an unsatisfied need for an improved system and method for transmitting video data over networks in a manner which decreases the probability of a failed transmission, improves the probability of successful decoding and/or increases the quality of error concealment on the receiver-side.

SUMMARY OF THE INVENTION

Systems and methods for transmitting data over lossy networks, such as wireless networks, are disclosed and claimed herein. In one embodiment, a method comprises transmitting an encoded data packet over a network, receiving an acknowledgment signal if the encoded data packet was successfully transmitted, and determining a number of retransmission attempts if the acknowledgment signal is not received, where the number of retransmission attempts is based at least in part on the type of data in the encoded data packet.

Other embodiments are disclosed and claimed herein.

BRIEF DESCRIPTION OF THE DRAWINGS

FIG. 5 depicts an IDR frame according to one embodiment; and

DETAILED DESCRIPTION OF THE EXEMPLARY EMBODIMENTS

Figure 1:
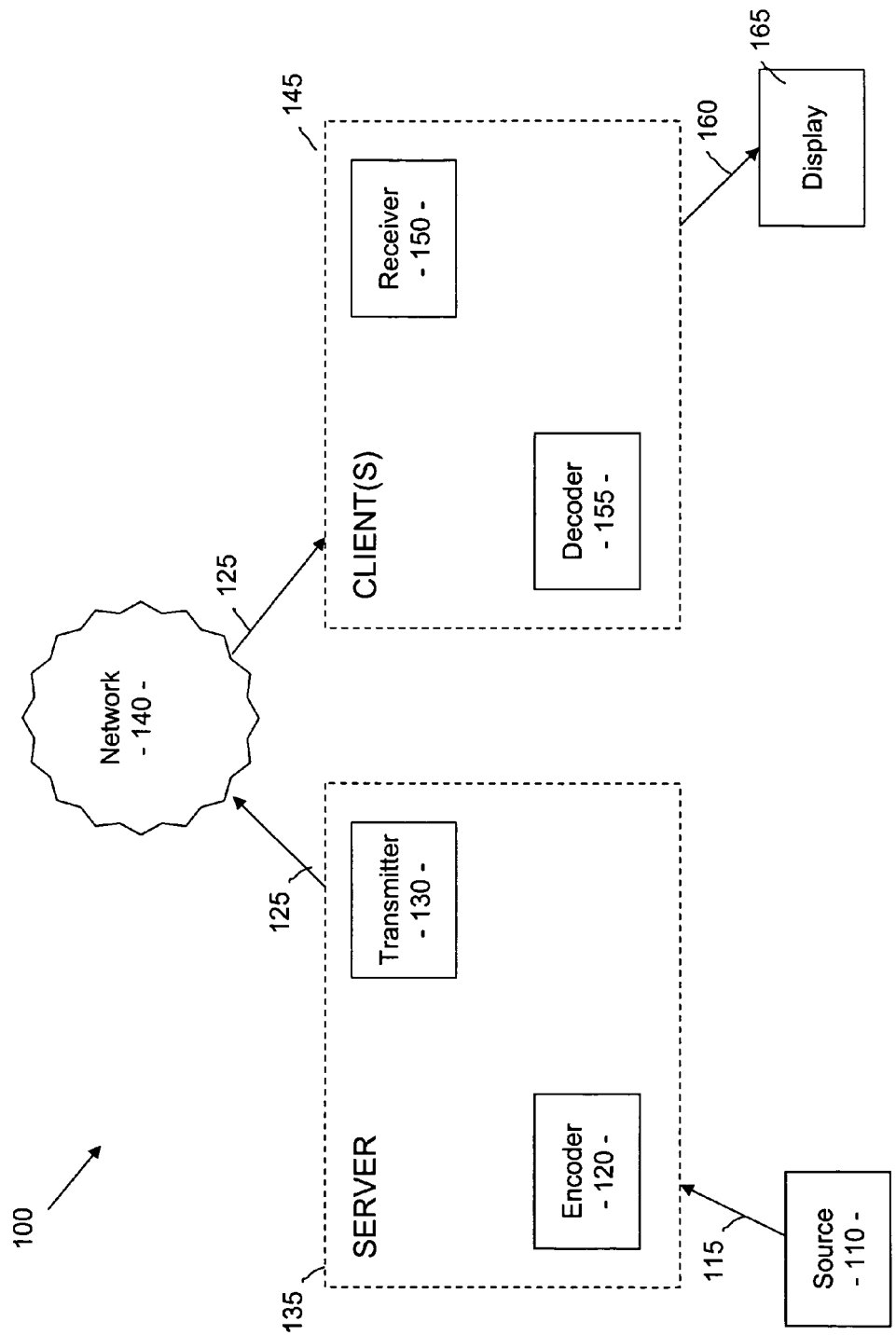
FIG. 1 depicts one embodiment of a simplified system overview for implementing one or more aspects of the invention.

The invention relates to a system in which data (e.g., video data) is being transmitted at least partially wirelessly over a lossy network originating from a server to one or more client-side systems. In one embodiment, the server includes an encoder module and a transmitter, while the client includes a decoder module and a receiver.

According to one aspect of the invention, data packets sent over the wireless network by the server which are not successfully received may be retransmitted a particular number of times. In one embodiment, the number of retransmission attempts is based on how important the data in the lost packet is considered. That is, in one embodiment, the number of retransmission attempts may be made adaptive, and packets considered more important (e.g., those containing IDR frames) are retransmitted a greater number of times as compared to less important packets (e.g., those containing P frames). In one embodiment, the aforementioned data packets may be encoded by an H.264/AVC encoder and/or sent over a 802.11x wireless network connection to be decoded by one or more H.264/AVC decoders.

Another aspect of the invention is to improve the probability of successful decoding at the client side. In one embodiment, this is done by having a decoder signal to a corresponding encoder to use multiple reference frames for subsequent prediction operations. In the case of an H.264/AVC system, this allows frames, such as P frames, that refer to data in prior frames (or in the case of B frames also future frames) to refer to macroblocks in multiple reference frames in order to determine the macroblocks in a current frame.

In another embodiment, the probability of successful decoding at the client side may be improved by identifying exactly which slices of the original data stream have not been received at the decoder. In one embodiment, this may be done by noting when an acknowledgment signal is not received for a given packet and all the packet retransmission attempts have been used. Using this information, an encoder may then stop referring to these lost slices/macroblocks in future coding operations. This may then limit the propagation of errors in future decoded frames at the client side. While in one embodiment, this may be done concurrently with the aforementioned operations, in another embodiment it may be subsequently performed.

Still another aspect of the invention is to estimate the distortion of the data caused by lost data packets/slices. Using this information, past pixels that are considers to have been reconstructed adequately by the error concealment at the client may continue to be referred to, while references to data not adequately reconstructed properly may be avoided. In one embodiment, the client itself may indicate the level of distortion back to the server given that the client decoder knows exactly what error concealment was used. This information may then be communicated back to the server. However, in another embodiment, an estimate of error of the received data may also be determined on the server-side by estimating the error concealment at the client for the given lost data packets, and the distortion may then be estimated by comparing the reconstructed data to the original data which is also available at the server.

Still another aspect of the invention is to increase the quality of error-concealment at the client by making use of the Flexible Macroblock Ordering (FMO) functionality of an H.264/AVC encoder/decoder system. That is, the reconstruction of IDR frames (on which all successive frames in the picture depend) may be made more robust by first decomposing each IDR frame into n fields such that all macroblocks of the IDR frame may be included in the n fields without duplication. Thereafter, each field may be segmented into m slices. In one embodiment, all m slices for the first field may be transmitted first, followed by the transmission of all m slices for the second field, and so on until all m slices for all n fields have been transmitted. This may be desirable since errors in lossy network environments (e.g., 802.11x) are often bursty, where a short burst of errors might eliminate all m slices, for example, for a given field. That being the case, if the m slices for different fields (e.g., 1, 3, 4, etc.) have been received correctly, then the error concealment functionality of the decoder (e.g., H.264/AVC decoder) may interpolate neighboring pixels to estimate the missing pixels since the missing macroblocks are spatially surrounded by available macroblocks.

While it should be appreciated that all or some of the aforementioned aspects of the invention may be implemented using an H.264/AVC encoder/decoder system and/or a 802.11x wireless network connection, it should equally be appreciated that they may also be implemented using other similar codecs and/or lossy communication channels.

When implemented in software, the elements of the invention are essentially the code segments to perform the necessary tasks. The program or code segments can be stored in a processor readable medium or transmitted by a computer data signal embodied in a carrier wave over a transmission medium or communication link.

H.264/AVC Overview

The H.264/AVC standard supports video coding that contains either progressive, interlaced frames or both mixed together in the same sequence. Generally, a frame of video contains two interleaved fields—a top and a bottom field. The two fields of an interlaced frame, which are separated in time by a field period, may be coded separately as two field pictures or together as a frame picture. A progressive frame, on the other hand, is coded as a single frame picture. However, it is still considered to consist of two fields at the same instant in time.

The VCL, which will be described in more detail below, represents the content of the video data. In contrast, the NAL formats the data and provides header information in a manner appropriate for conveyance by the transport layers or storage media. All data is contained in NAL units, each of which contains an integer number of bytes. An NAL unit specifies a generic format for use in both packet-oriented and bitstream systems.

The VCL of the H.264/AVC standard is similar in spirit to other standards such as MPEG-2. In short, it consists of a hybrid of temporal and spatial prediction, in conjunction with transform coding. Each picture of a video, which can either be a frame or a field, is partitioned into fixed-size macroblocks that cover a rectangular picture area of 16×16 samples of the luma component and 8×8 samples of each of the two chroma components. All luma and chroma samples of a macroblock are either spatially or temporally predicted, and the resulting prediction residual is transmitted using transform coding.

The macroblocks are organized in slices, which represent portions of a given image that can be decoded independently, and the transmission order of macroblocks in the bitstream depends on a Macroblock Allocation Map. The H.264/AVC standard supports five different slice-coding types. The simplest one is referred to as an I slice, or Intra slice. In I slices, all macroblocks are coded without referring to other pictures within the video sequence. On the other hand, prior-coded images can be used to form a prediction signal for macroblocks of the predictive-coded P and B slices (where P stands for predictive and B stands for bi-predictive). The two additional slice types are SP (switching P) and SI (switching I), which are specified for efficient switching between bitstreams coded at various bit-rates.

The H.264/AVC standard supports a feature called Flexible Macroblock Ordering (FMO) in which a pattern that assigns the macroblocks in a picture to one or several slice groups is specified. Each slice group may then be transmitted separately.

System Architecture Overview

FIG. 1 depicts one embodiment of a system 100 for carrying out one or more aspects of the invention. In particular, system 100 includes the capture of video content from source 110. In one embodiment, video content 115 may be real-time content transmitted from a real-time video source. Regardless of whether the video content 115 is real-time content or not, it may then be provided to server 135 which, in the embodiment of FIG. 1, is comprised of encoder 120 and transmitter 130. In one embodiment, encoder 120 processes the video content 115 from source 110 in order to provide encoded data 125 to some destination point via network 140. In one embodiment, encoder 120 may encode video content 115 in accordance with the previously-described H.264/AVC coding standard. However, it should equally be appreciated that the invention may be used with similar codecs other than the H.264/AVC coding standard Once encoded, encoded data 125 is provided to transmitter a client 145, as shown in FIG. 1. While in one embodiment, transmitter 130 is a 802.11x or 802.15.3a wireless transmitter, it should equally be appreciated that transmitter 130 may also transmit data according to numerous other lossy protocols. Regardless of the wireless protocol employed, encoded data 125 may then be provided to and sent over network 140. In one embodiment encoder 120 may encode video content 115 in accordance with the previously-described H.264/AVC coding standard. However, it should equally be appreciated that the invention may be used with similar codecs other than the H.264/AVC coding standard, and with lossy networks other than 802.11x/802.15.3a wireless networks.

Continuing to refer to FIG. 1, client 145 includes receiver 150 and decoder 155. Encoded data 125 may be received by receiver 145, which is in communication with network 140 (e.g., the Internet). Receiver 150 may then provide the encoded data 125 to decoder 150. In another embodiment, the encoded data 125 may be received and decoded by a plurality of client-side devices (not shown). Depending on the coding standard used by the encoder 120 (e.g., H.264/AVC), the decoder 155 may then perform specific decoding operations on the encoded data 125 to provide decoded video content 160 to a connected display device 165, as shown in FIG. 1.

It should be appreciated that server 135 and client 145 may have numerous configurations other than as depicted in FIG. 1. For example, either or both of encoder 120 and transmitter 130 may be separate from server 135. Similarly, either or both of decoder 155 and receiver 150 need not be integrated into client 145.

Although not depicted, it should equally be appreciated that server 135 and/or client 145 may include other components, such as a central processing unit (CPU), which may include an arithmetic logic unit (ALU) for performing computations, a collection of registers for temporary storage of data and instructions, and a control unit for controlling operation for the computer system. In one embodiment, the CPU may be any one of the x86, Pentium™ class microprocessors as marketed by Intel™ Corporation, microprocessors as marketed by AMD™, or the 6x86MX microprocessor as marketed by Cyrix™ Corp. In addition, any of a variety of other processors, including those from Sun Microsystems, MIPS, IBM, Motorola, NEC, Cyrix, AMD, Nexgen and others may be used. Moreover, any such CPU need not be limited to microprocessors, but may take on other forms such as microcontrollers, digital signal processors, reduced instruction set computers (RISC), application specific integrated circuits, and the like.

Other components that the server 135 and/or client 145 may include are a random access memory, a non-volatile memory (e.g., hard disk, floppy disk, CD-ROM, DVD-ROM, tape, high density floppy, high capacity removable media, low capacity removable media, solid state memory device, etc., and combinations thereof). The server 135 and/or client 145 may also include a network interface (e.g., a network interface card, a modem interface, integrated services digital network, etc.), and a user input device (e.g., a keyboard, mouse, joystick and the like for enabling a user to interact with and provide commands).

It should further be appreciated that the server 135 and/or client 145 may include system firmware, such as system BIOS, and an operating system (e.g., DOS, Windows, Unix, Linux, Xenix, etc) for controlling the server 135 and/or client's operation and the allocation of resources.

Decreasing Probability of a Failed Transmission

Figure 2:
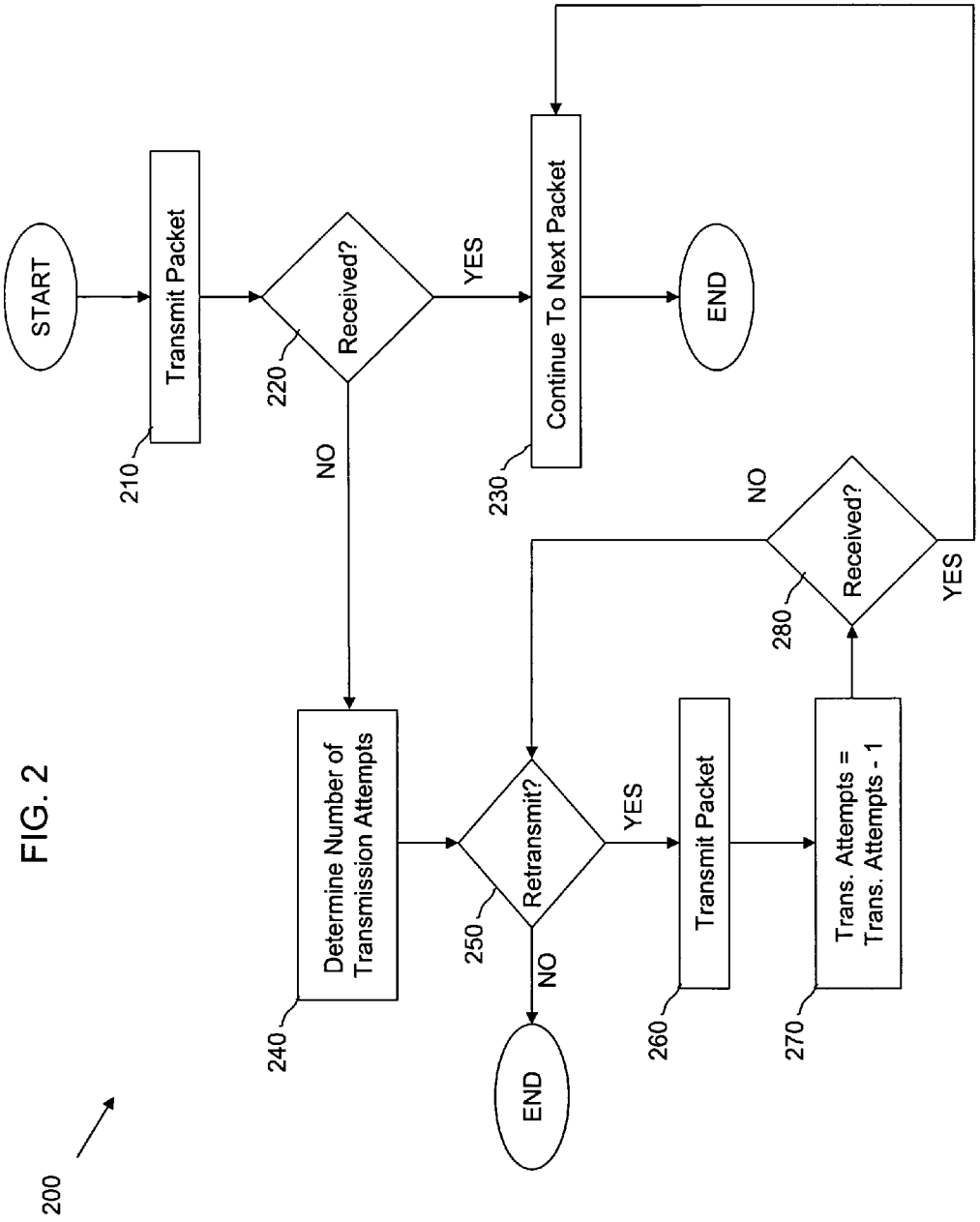
FIG. 2 depicts a process for carrying one aspect of the invention in accordance with one embodiment.

As mentioned above, one aspect of the invention is to be able to decrease the probability of a failed transmission. To that end, FIG. 2 depicts a process 200 for how the probability of a failed transmission may be decreased in accordance with one embodiment of the invention. With real-time wireless transmissions, it is not always feasible to guarantee successful transmission of all data packets. In particular, excessive redundant transmissions can lead to unacceptable latencies. With that said, some data packets can be considered more important than others. Hence, the number of retransmission attempts may be a function of the importance of the packets in question. For example, packets containing Instantaneous Decoder Refresh (IDR) frames may be retransmitted a greater number of times as compared to less important packets, such as those containing predictive frames, or P frames. To that end, process 200 begins at block 210 with the transmission of a data packet. A determination may then be made at block 220 as to whether the packet was received or not. In one embodiment, this determination may be based on whether the destination receiver (e.g., client 145) provided an ACK signal back to the source (e.g., server 135). However, it should equally be appreciated that successful packet delivery may be determined using other means as well.

If it is determined at block 220 that the packet in question was in fact received, then process 200 simply moves to block 230 where the next data packet is processed. If, on the other hand, it is determined that the packet was not properly received, then process 200 may continue to block 240 where a determination is made as to what number of retransmission should be attempted for the given packet. In one embodiment, the number of retransmission attempts is based on the importance of the data contained within the given packet. In another embodiment, the number of retransmissions is made adaptive at all levels at which retransmission is implemented to occur. For example, the number of retransmissions may be made adaptive at the 802.11x MAC layer, as well as at the RTP layer if a form of reliable or semi-reliable RTP retransmission has been implemented.

Once the packet's number of retransmissions has been determined, process 200 will continue to block 250 where it is determined if the packet should be re-sent or not. If the number of retransmission attempts equals zero, then the packet will not be re-sent and process 200 ends. If, on the other hand, the number of retransmission attempts is greater than zero, then process 200 will continue to block 260 where the packet is re-sent, and then the number of remaining retransmission attempts is reduced by 1 (block 270). Once re-sent, a determination must then be made at block 280 as to whether the re-sent packet was received this time. If so, then process 200 simply moves to block 230 where the next data packet is processed. If not, then process 200 moves back to block 250 where it is determined if the packet should be re-sent or not (i.e., determine if the number of retransmission attempts equals zero or not).

Increasing Probability of Successful Decoding

Figure 3:
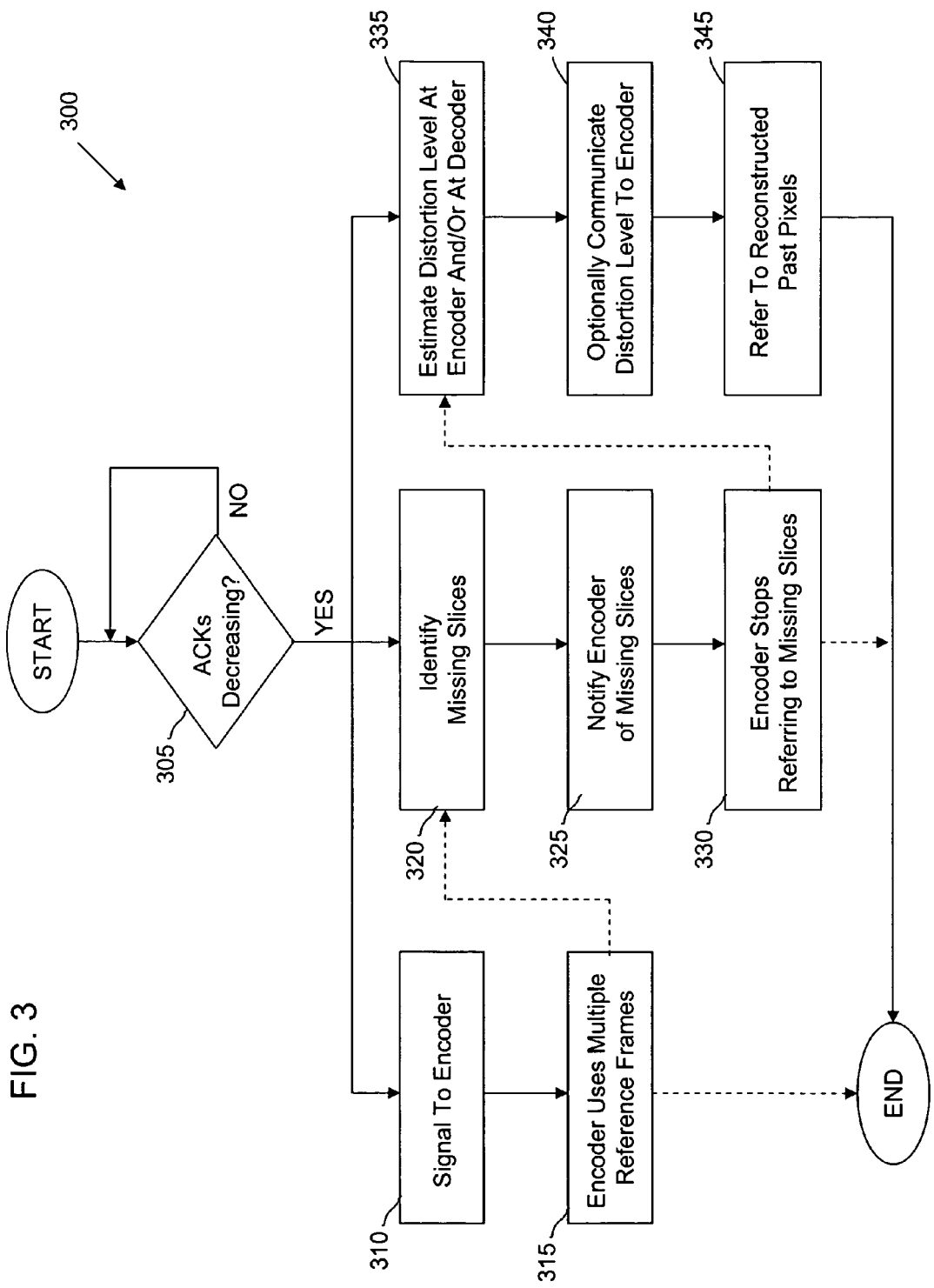
FIG. 3 depicts a process for carrying another aspect of the invention, according to one embodiment.

As mentioned above, another aspect of the invention is to increase the probability of successful decoding at the client side of a lossy transmission. To that end, FIG. 3 illustrates one embodiment of a process 300 for improving the decoding of video content transmitted over a lossy network (e.g., network 140). In particular, process 300 begins with a determination of whether or not the number of transmission failures has increased. This may be done, for example, by detecting a decreasing number of ACKs sent by a client side device (e.g., client 145). In one embodiment, a predetermined threshold may be used to compare the number of ACKs against. Once the number of ACKs (or the rate of ACKs received per given time period) falls below the predetermined threshold, process 300 continues to one or more of blocks 310, 320 and 335. That is, portions of process 300 may be carried out concurrently or sequentially. For example, the portions of process 300 which comprise blocks 310-315 may be carried out concurrently with the operations described below with reference to blocks 320-330 and/or blocks 335-345.

Once the number of ACKs (or the rate of ACKs received) falls below the predetermined threshold, the client or decoder-side may signal back to the encoder that it should use multiple reference frames for prediction purposes. For example, in the case of a H.264/AVC encoder, P frames that refer to data in prior frames (or in the case of B frames also future frames) to refer to macroblocks in multiple reference frames in order to determine the macroblocks in the current frame. Hence, if one of the reference frames is missing due to a lossy transmission error, the current frame can still be successfully reconstructed assuming the other reference frames are not also lost.

Thus, by using multiple reference frames (block 315) the probability that a lost frame will cause a cascading effect that leads to corruption of future predicted frames can be effectively decreased. As illustrated by the dashed progress lines leading from block 315, the operations of blocks 310-315 may be performed either concurrently with or sequentially with the operations described below with reference to blocks 320-330 and 335-345.

Regardless of whether sequentially or concurrently performed, at block 320 the server side (e.g., server 135) may identify exactly which slices of the original video stream have not been received at the decoder. In one embodiment, this information is available since the server knows which data packets are lost because a ACK signal would not have been received for the given packet at the 802.11x MAC layer, or which RTP packets are lost at the RTP application layer. Once the missing slices have been identified, process 300 may continue to block 325 where the encoder is notified of exactly which slices (and hence which macroblocks) have not been received by the decoder. Using this information, the encoder (which in one embodiment is an H2.64/AVC encoder) will stop referring to these lost slices/macroblocks in future P and B frames (block 330). In another embodiment, the encoder may also generate additional IDR frames if necessary.

Either currently with or sequentially to the aforementioned operations of process 300, the level of distortion caused by the missing packets may be estimated by the server at block 335. This may be significant since not all lost packets degrade the video equally, specially since many decoders (e.g., H264 decoders) employ error concealment. In one embodiment, the client itself may estimate the distortion of the client's video caused by the lost packets. This may be preferable since the decoder will know exactly how it has implemented possibly proprietary error concealment. In this case, the level of distortion may be communicated back to the server (block 340).

Alternatively, this back channel of communication between the client and server may be unreliable. In that case, an estimate of the error of the final video may also be determined at the server by estimating the error concealment at the client for the given lost slices/packets. The distortion may be estimated by comparing the reconstructed video to the original video which is also available at the server. Regardless of whether the distortion has been estimated on the client side or on the server side, this information may then be used by the encoder to only refer to past pixels that are considered to have been reconstructed adequately by the error concealment at the client (block 345).

In addition to real-time video content, the process 300 of FIG. 3 may also be implemented for pre-stored streams on the server side (such as on a PVR or at a ISP's head-end). In this case, several versions of the same encoded stream can be pre-stored, which can decrease the latency of producing these multiple versions of encoded data on the fly. In other cases where the content is being encoded in real-time, in latency-critical applications it may be preferable to generate multiple encoded streams (e.g., H.264/AVC) simultaneously in a manner that allows switching between them to limit dependencies on any specific lost slices as explained above.

Increasing Quality of Error Concealment

Figure 4:
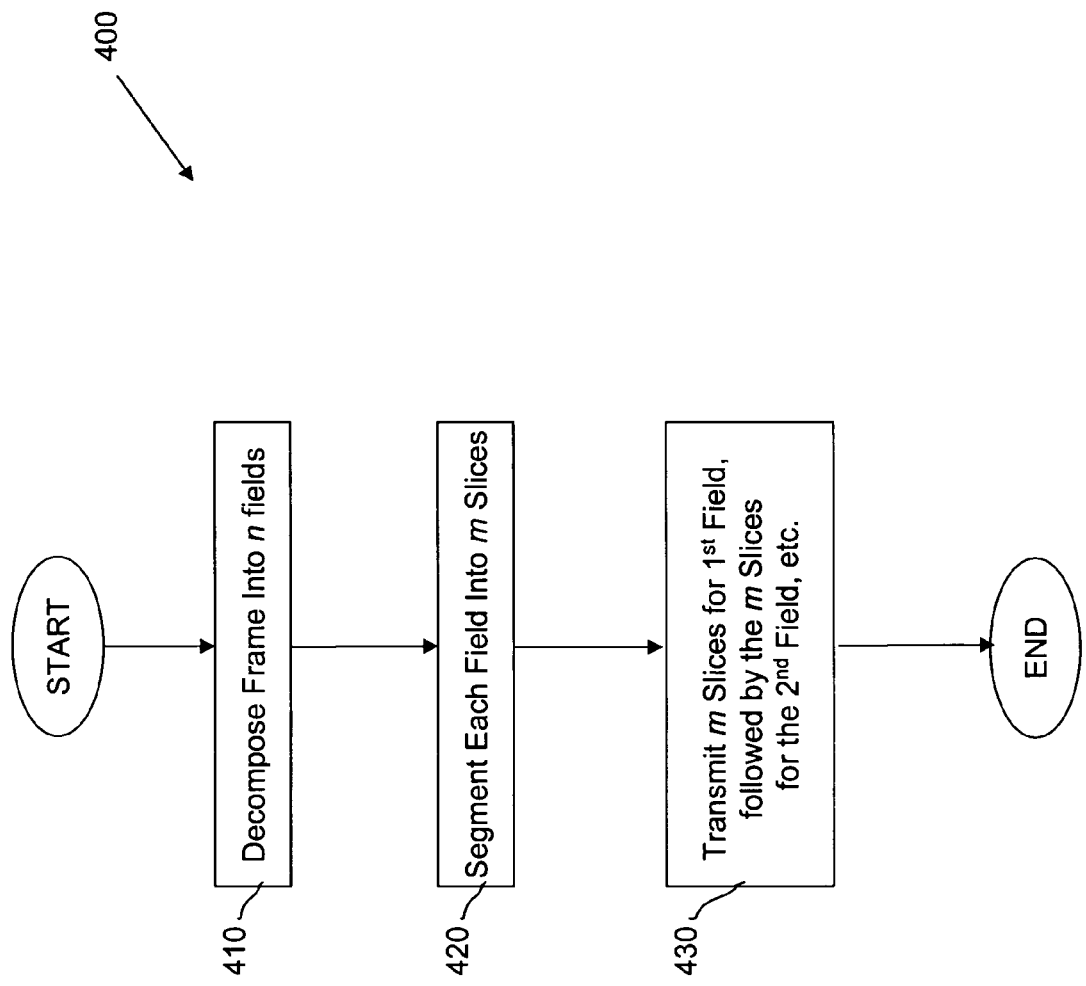
FIG. 4 depicts a process for carrying yet another aspect of the invention, according to one embodiment.

As mentioned above, another aspect of the invention is to increase the quality of error concealment at the client side of a lossy transmission. To that end, FIG. 4 illustrates one embodiment of a process 400 for using error concealment to reduce the distortion of the video content caused by the missing macroblocks. In the case of an H.264/AVC encoder, Flexible Macroblock Ordering (FMO) is available. The reconstruction of IDR frames (on which all successive frames in the picture depend) may be made more robust using the process 400 of FIG. 4. In particular, process 400 begins at block 410 by decomposing each IDR frame into n fields. As will be shown below with reference to FIG. 5, each field may comprise macroblocks spatially separated from other macroblocks by p macroblocks. Hence, all macroblocks of the IDR frame may be included in the n fields without duplication. Thereafter at block 420 each field may be segmented into m slices by the NAL, where size restrictions may be imposed by a wireless network (e.g., 802.11x) link layer.

Once the fields have been segmented into m slices, process 400 may continue to block 430 for all m slices for the first field may be transmitted first, followed by the transmission of all m slices for the second field, and so on until all m slices for all n fields have been transmitted. This form of transmission may be particularly useful for transmissions over a lossy network in which errors are often bursty (e.g., 802.11x), where a short burst of errors might eliminate all m slices for a given field. However, if the m slices for different fields (e.g., 1, 3, 4, etc.) have been received correctly, then the error concealment functionality of the decoder (e.g., H.264/AVC decoder) will be able to interpolate neighboring pixels to estimate the missing pixels given that the missing macroblocks are spatially adjacent to or surrounded by available macroblocks. This approach avoids the need to transmit duplicate data to compensate for lost packets or slices, hence requiring less bandwidth. In another embodiment, instead of a single macroblock separated by n macroblocks, the single macroblock may itself be expanded to include a group of macroblocks around the original macroblock.

In another embodiment, the encoding process 400 of FIG. 4 may also help the buffer management and streaming stacks to determine which packets of data can be dropped prior to wireless transmission (or after wireless reception) should critical congestion occur at other stages of the network. By dropping a network packet containing one of the fields of the frame may result in better decoded video quality at the receiver compared to randomly dropping any packet in the original stream. It should further be appreciated that, for specific applications in which spatial multiplexing MIMO wireless technology is used, it is possible to optionally transmit each field on a separate spatial channel to further improve performance.

While the aforementioned process 400 was described in terms of IDR frames, it should further be appreciated that it may be used with any type of data frame containing spatial intra-frame data so long as the available bandwidth and computational resources permit.

Figure 5:
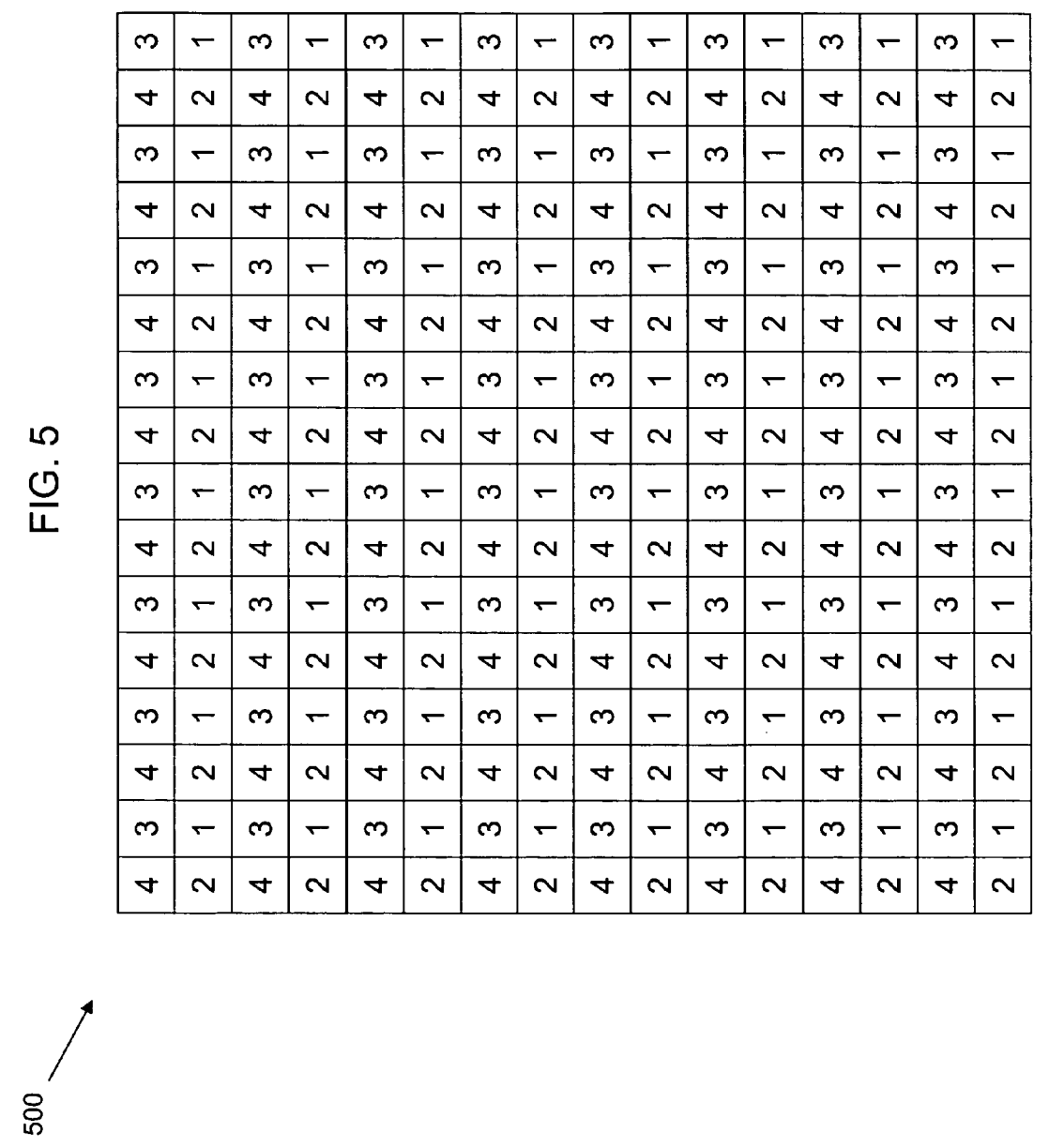

Referring now to FIG. 5, depicted is one embodiment of an IDR frame 500 comprised of 4 fields, where the individual macroblock of any one field are spatially separated from each other by p=1 macroblock in both the horizontal and vertical directions. Field #3, for example, is comprised of all the individual macroblocks labeled "3," as shown in FIG. 5. In this fashion, Field #3 may be transmitted in multiple slices/packets so as to reduce the consequence of bursty errors by improving the error concealment functionality on the decoder side.

Figure 6:
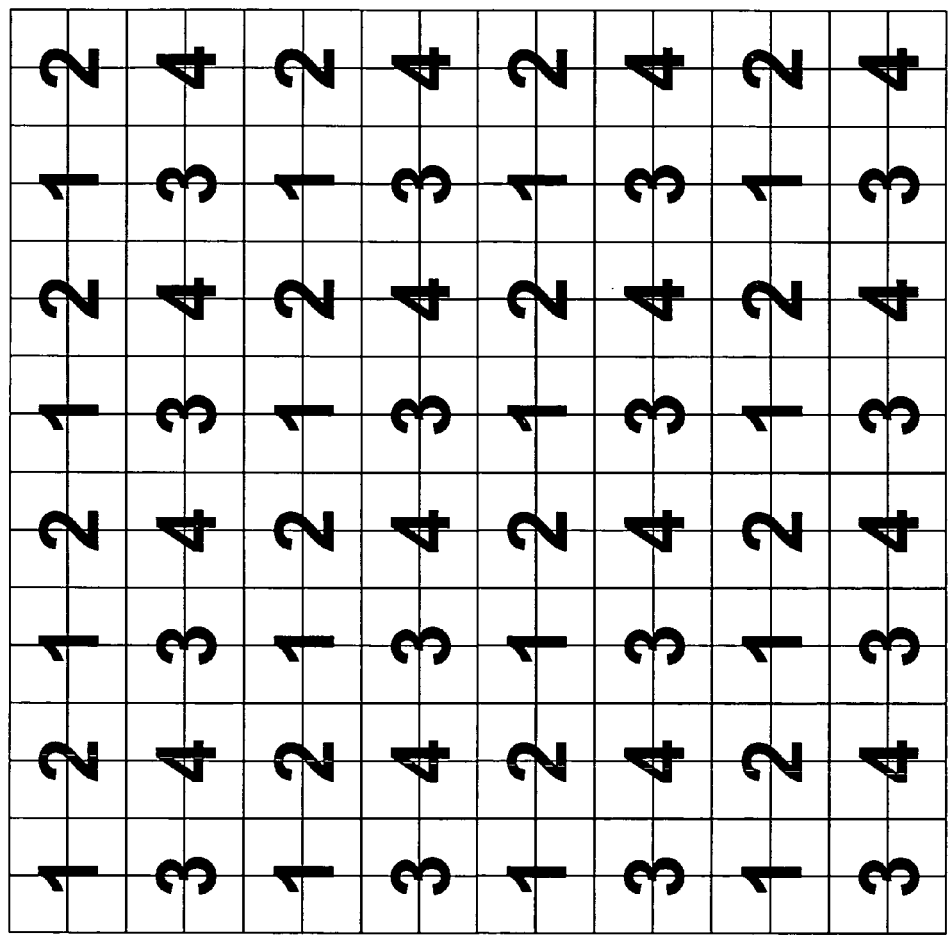
FIG. 6 depicts an IDR frame according to another embodiment.

FIG. 6 depicts another embodiment of an IDR frame 600. However, in the embodiment of FIG. 6, the IDR frame 600 is comprised of a plurality of "super-macroblocks." In this embodiment, a super-macroblock is made up of 4 individual macroblocks all containing data for the same field. Thus, all super-macroblocks labelled #1, for example, are considered part of Field #1 and are transmitted as one or more slices in sequence. Thereafter, the same is done for Field #2 (which is correspondingly comprised of the super-macroblocks labelled #2), then Field #3 and so on. Compared to the macroblock based algorithm of FIG. 5, the super-macroblock algorithm of FIG. 6 will tend to increase encoding efficiency but decrease accuracy of reconstruction at the decoder should a field be lost in transmission.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method comprising:
   transmitting a plurality of encoded data packets over a network;
   receiving an acknowledgment signal when each of said plurality of encoded data packets is successfully transmitted;
   determining a number of retransmission attempts for any of the plurality of encoded data packets for which said acknowledgment signal is not received, wherein said number of retransmission attempts is based on a type of data in a corresponding one of the plurality of encoded data packets for which the acknowledgment signal is not received;
   increasing said number of retransmission attempts when said type of data in the corresponding one of the plurality of encoded data packets is Instantaneous Decoder Refresh (IDR) frame data; and
   retransmitting each of the plurality of encoded data packets, for which said acknowledgment signal is not received, a number of times that does not exceed the number of retransmission attempts determined for each of such plurality of encoded data packets.

2. The method of claim 1, wherein said encoded data packet is encoded according to an H.264/AVC coding standard.

3. The method of claim 2, wherein transmitting the plurality of encoded data packets comprises transmitting the plurality of encoded data packets over a lossy wireless network.

4. The method of claim 1, further comprising:
   determining if a number of transmission failures exceeds a predetermined threshold; and if so,
   signaling that multiple reference frames should be used for encoding predictions.

5. The method of claim 4, wherein determining if the number of transmission failures exceeds the predetermined threshold comprises detecting a decrease in a number of acknowledgment signals being sent.

6. The method of claim 1, wherein the plurality of encoded data packets comprises encoded video data, and wherein the method further comprising:
   determining if a number of transmission failures exceeds a predetermined threshold; and if so,
   identifying one or more slices of said encoded video data which were not successfully transmitted;
   notifying an encoder of said encoded video data of said one or more slices; and
   ceasing to refer to said one or more slices when encoding subsequent frames of said encoded video data.

7. The method of claim 1, further comprising:
   estimating a distortion level caused by the unsuccessful receipt of a plurality of lost data packets from among said plurality of encoded data packets transmitted over said network; and
   encoding additional video data using said distortion level to avoid referencing said plurality of lost data packets.

8. A computer implemented method intended for implementation in a system comprising:
   a network;
   a client coupled to said network, said client including a decoder and a receiver;
   a server coupled to said network via a network interface, wherein said server is configured to execute the computer implemented method, the computer implemented method comprising:
   transmit, via the network interface, a plurality of encoded data packets over the network to said client,
   receive an acknowledgment signal over the network via the network interface when each of said plurality of encoded data packets is successfully transmitted to said client,
   determine a number of retransmission attempts for any of the plurality of encoded data packets for which said acknowledgment signal is not received, wherein said number of retransmission attempts is based on a type of data in a corresponding one of the plurality of encoded data packets for which the acknowledgment signal is not received;
   increasing said number of retransmission attempts when said type of data in the corresponding one of the plurality of encoded data packets is Instantaneous Decoder Refresh (IDR) frame data; and
   retransmit to said client over the network using the network interface, each of the plurality of encoded data packets for which said acknowledgment signal is not received, a number of times that does not exceed the number of retransmission attempts determined for each of such plurality of encoded data packets.

9. The system of claim 8, wherein said plurality of encoded data packets comprises a plurality of H.264/AVC encoded data packets.

10. The system of claim 9, wherein said network is a lossy wireless network.

11. The system of claim 8, wherein said client comprises means for determining if a number of transmission failures exceeds a predetermined threshold, and if so, signaling to said server that multiple reference frames should be used for encoding predictions.

12. The system of claim 11, wherein said client comprises means for determining if the number of transmission failures exceeds the predetermined threshold by detecting a decrease in a number of acknowledgment signal sent by said client.

13. The system of claim 8, wherein the plurality of encoded data packets comprises encoded video data, and wherein said processor is further configured to execute the processor-executable instructions to cause the server to,
   determine if a number of transmission failures exceeds a predetermined threshold, and if so,
   identify one or more slices of said encoded video data which were not successfully transmitted, and
   stop referring to said one or more slices when encoding subsequent frames of said encoded video data.

14. The system of claim 8, wherein at least one of said server and client means for estimating a distortion level caused by the unsuccessful receipt of a plurality of lost data packets from among said plurality of encoded data packets transmitted over said network, and wherein said encoder is adapted to encode additional video data using said distortion level to avoid referencing said plurality of lost data packets.

* * * * *

UNITED STATES PATENT AND TRADEMARK OFFICE
CERTIFICATE OF CORRECTION

| | | |
|---|---|---|
| PATENT NO. | : 7,747,921 B2 | |
| APPLICATION NO. | : 11/197818 | |
| DATED | : June 29, 2010 | |
| INVENTOR(S) | : Behram DaCosta | |

It is certified that error appears in the above-identified patent and that said Letters Patent is hereby corrected as shown below:

In claim 9 at column 10 line 43, replace "system" with --method--;

In claim 10 at column 10 line 46, replace "system" with --method--;

In claim 11 at column 10 line 49, replace "system" with --method--;

In claim 12 at column 10 line 54, replace "system" with -method--;

In claim 13 at column 10 line 58, replace "system" with --method--;

In claim 14 at column 11 line 1, replace "system" with --method--.

Signed and Sealed this
Thirtieth Day of August, 2011

David J. Kappos
*Director of the United States Patent and Trademark Office*